United States Patent [19]

Fowler et al.

[11] Patent Number: 5,618,460

[45] Date of Patent: *Apr. 8, 1997

[54] TEMPERATURE REGULATING CONTROL SYSTEM FOR AN OVEN OF A COOKING APPARATUS AND METHODS OF MAKING AND OPERATING THE SAME

[75] Inventors: Daniel L. Fowler, Kentwood, Mich.; Lee A. Hart, Minnetonka, Minn.

[73] Assignee: Robertshaw Controls Company, Richmond, Va.

[ * ] Notice: The term of this patent shall not extend beyond the expiration date of Pat. No. 5,477,032.

[21] Appl. No.: 531,540

[22] Filed: Sep. 21, 1995

Related U.S. Application Data

[62] Division of Ser. No. 130,019, Sep. 30, 1993, Pat. No. 5,477,032.

[51] Int. Cl.⁶ ................................................. H05B 1/02
[52] U.S. Cl. ........................... 219/497; 219/501; 219/505; 219/483; 340/584
[58] Field of Search ..................................... 219/505, 501, 219/483–486, 507, 509, 511, 488, 481; 307/117, 119, 87, 64

[56] References Cited

U.S. PATENT DOCUMENTS 4,701,690  10/1987  Fernandez et al. ..................... 322/28
4,782,215  11/1988  Kadwell et al. ........................ 219/494
5,029,244   7/1991  Fowler ................................... 219/407
5,378,874   1/1995  Holling et al. ......................... 219/506

Primary Examiner—Mark H. Paschall
Attorney, Agent, or Firm—Fulbright & Jaworski LLP

[57] ABSTRACT

A temperature regulating control system for an oven of a cooking apparatus and methods of making and operating the same are provided, the system having a circuit for interconnecting a power source to a load of the apparatus in a regulated manner so as to tend to provide a selected temperature output of the load for the oven, the circuit comprising a microcomputer, external components, and a voltage regulator for providing a regulated voltage from the power source for operating the microcomputer so that the microcomputer can operate the external components, the circuit having a temperature sensing unit to sense the ambient temperature of a portion of the circuit and provide a warning signal to the microcomputer that a first high ambient temperature has been sensed so that the microcomputer can shut down the external components of the system in a controlled manner before a second higher ambient temperature is sensed by the temperature sensing unit.

14 Claims, 4 Drawing Sheets

TEMPERATURE REGULATING CONTROL SYSTEM FOR AN OVEN OF A COOKING APPARATUS AND METHODS OF MAKING AND OPERATING THE SAME

This application is a division of application Ser. No. 08/130,019, filed Sep. 30, 1993 now U.S. Pat. No. 5,477,032.

BACKGROUND OF THE INVENTION

1. Field of the Invention

This invention relates to a new control system and to new methods of operating and making the control system, the control system being particularly adapted for regulating the temperature of an oven of a cooking apparatus or the like.

2. Prior Art Statement

It is known to provide a temperature regulating control system for an oven of a cooking apparatus, the system having circuit means for interconnecting a power source to load means of the apparatus in a regulated manner so as to tend to provide a selected temperature output of the load means for the oven, the circuit means comprising a microcomputer means, external component means and voltage regulator means for providing a regulated voltage from the power source for operating the microcomputer means so that the microcomputer means can operate the external component means. For example, see the Kadwell et al, U.S. Pat. No. 4,782,215 and the Fowler U.S. Pat. No. 5,029,244.

SUMMARY OF THE INVENTION

It is one of the features of this invention to provide a new temperature regulating control system for an oven of a cooking apparatus wherein means are provided to warn the microcomputer means of the system that a certain adverse event is going to happen which would be detrimental to the system if the microcomputer means does not take some action before the particular adverse event occurs.

For example, it was found according to the teachings of this invention that a part of the control system remote from the oven of the cooking apparatus can sense the ambient temperature of that part of the system so that if a detrimental high ambient temperature appears to be imminent, a temperature sensing means of the system can provide a warning signal to the microcomputer means that a first high ambient temperature has been sensed so that the microcomputer means can shut down the external component means of the system in a controlled manner before a second higher ambient temperature is sensed by the temperature sensing means.

For example, one embodiment of this invention comprises a temperature regulating control system for an oven of a cooking apparatus, the system having circuit means for interconnecting a power source to load means of the apparatus in a regulated manner so as to tend to provide a selected temperature output of the load means for the oven, the circuit means comprising a microcomputer means, external component means, and voltage regulator means for providing a regulated voltage from the power source for operating the microcomputer means so that the microcomputer means can operate the external component means, the circuit means having temperature sensing means to sense the ambient temperature of a portion of the circuit means and provide a warning signal to the microcomputer means that a first high ambient temperature has been sensed so that the microcomputer means can shut down the external component means of the system in a controlled manner before a second higher ambient temperature is sensed by the temperature sensing means.

The control system of this invention has means to also warn the microcomputer means that the regulated voltage is going out of regulation so that the microcomputer means can shut down the external component means of the system in a controlled manner before the voltage regulator means turns off the regulated voltage.

For example, another embodiment of this invention comprises a temperature regulating control system for an oven of a cooking apparatus, the system having circuit means for interconnecting a power source to load means of the apparatus in a regulated manner so as to tend to provide a selected temperature output of the load means for the oven, the circuit means comprising a microcomputer means, external component means, and voltage regulator means for providing a regulated voltage from the power source for operating the microcomputer means so that the microcomputer means can operate the external component means, the voltage regulator means having detection means to provide a warning signal to the microcomputer means that the regulated voltage is going out of regulation so that the microcomputer means can shut down the external component means of the system in a controlled manner before the voltage regulator means turns off the regulated voltage.

It is another feature of this invention to provide a temperature regulating control system for an oven of a cooking apparatus wherein the circuit means has a power-on reset means that operates the microcomputer means of the system regardless of which state (high or low) resets the microcomputer means without requiring a changing of the power-on reset means of the control system.

For example, another embodiment of this invention comprises a temperature regulating control system for an oven of a cooking apparatus, the system having circuit means for interconnecting a power source to load means of the apparatus in a regulated manner so as to tend to provide a selected temperature output of the load means for oven, the circuit means comprising a microcomputer means, external component means, and voltage regulator means for providing a regulated voltage for the power source for operating the microcomputer means so that the microcomputer means can operate the external component means, the circuit means having a power-on reset means that operates the microcomputer means regardless of which state resets the microcomputer means without changing the power-on reset means.

It is another feature of this invention to provide a temperature regulating control system for an oven of a cooking apparatus wherein means are provided to continuously toggle the reset input of the microcomputer means with a high state and then a low state until the circuit means detects that the microcomputer means is operating by sensing a continuous pulse from a pulsing output means of the microcomputer means.

For example, another embodiment of this invention comprises a temperature regulating control system for an oven of a cooking apparatus, the system having circuit means for interconnecting a power source to load means of the apparatus in a regulated manner so as to tend to provide a selected temperature output of the load means for the oven, the circuit means comprising a microcomputer means, external component means, and voltage regulator means for providing a regulated voltage from the power source for operating the microcomputer means so that the microcomputer means can operate the external component means, the microcomputer means having a reset input and a pulsing output means that continuously pulses when the microcomputer means has been reset and is then operating properly, the circuit means comprising a power-on reset means that toggles between a high state and a low state at the reset input of the microcomputer means until the power-on reset means receives the continuous pulses from the pulsing output means of the microcomputer means.

Accordingly, it is an object of this invention to provide a new temperature regulating control system for an oven of a cooking apparatus, the system of this invention having one or more of the novel features of this invention as set forth above or hereinafter shown or described.

Another object of this invention is to provide a new method of operating such a control system, the method of this invention having one or more of the novel features of this invention as set forth above or hereinafter shown or described.

Another object of this invention is to provide a new method of making such a control system, the method of this invention having one or more of the novel features of this invention as set forth above or hereinafter shown or described.

Other objects, uses and advantages of this invention are apparent from a reading of this description which proceeds with reference to the accompanying drawings wherein:

BRIEF DESCRIPTION OF THE DRAWINGS

FIGS. 2A and 2B respectively illustrate parts of the control system of this invention and are adapted to be arranged in the manner illustrated in FIG. 1 to provide the entire control system of this invention.

DESCRIPTION OF THE PREFERRED EMBODIMENT

Figure 2A:
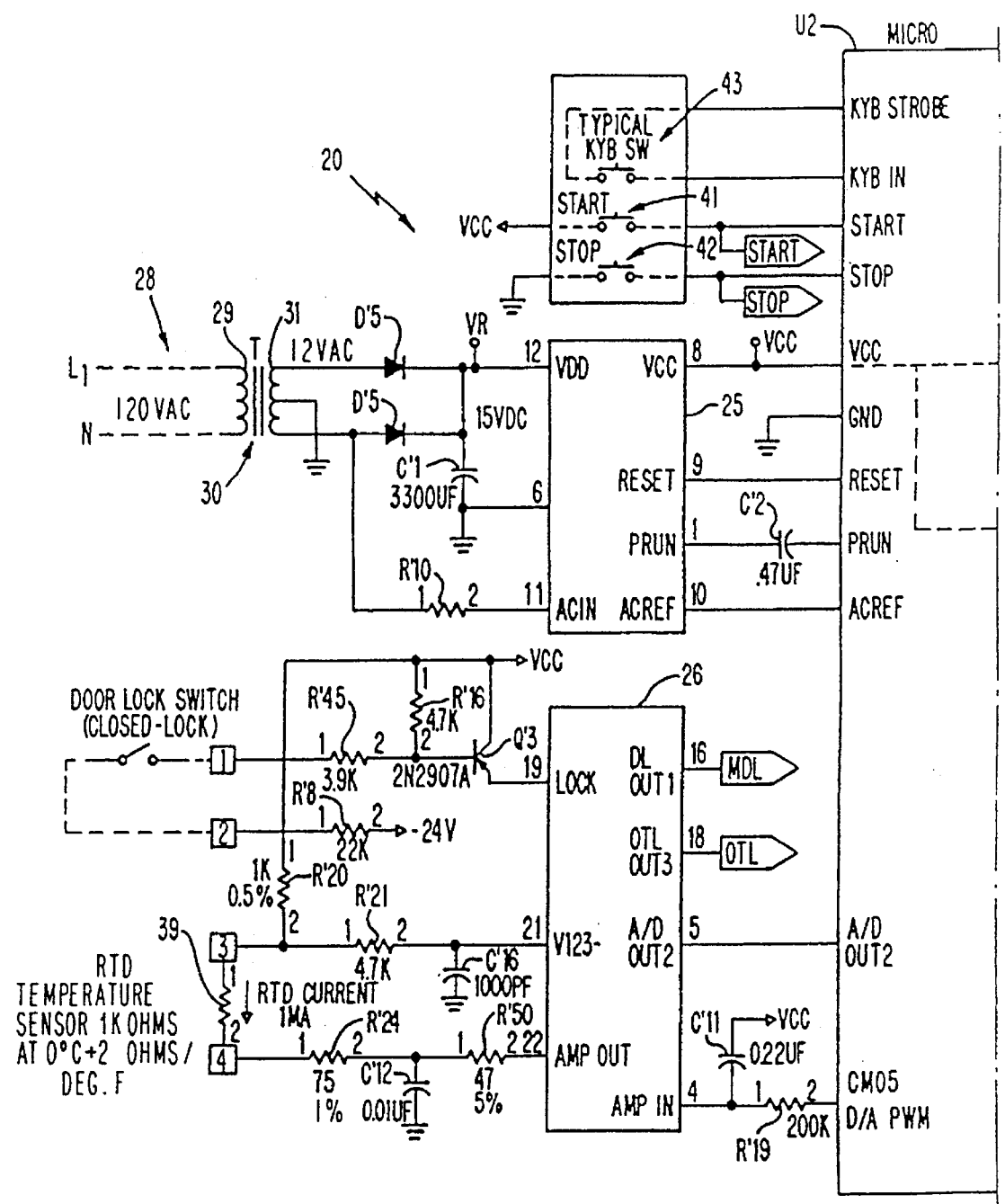
FIGS. 2A and 2B are to be positioned relative to each other in order to illustrate the entire control system of this invention.

While the various features of this invention are hereinafter illustrated and described as being particularly adapted to provide a control system for controlling a domestic cooking oven or the like, it is to be understood that the various features of this invention can be utilized singly or in any combination thereof to provide a control system for controlling other apparatus or appliances as desired.

Therefore, this invention is not to be limited to only the embodiment illustrated in the drawings, because the drawings are merely utilized to illustrate one of the wide variety of uses of this invention.

Figure 1:
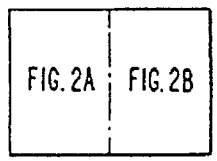
FIG. 1 is a schematic view illustrating how
Figure 2B:
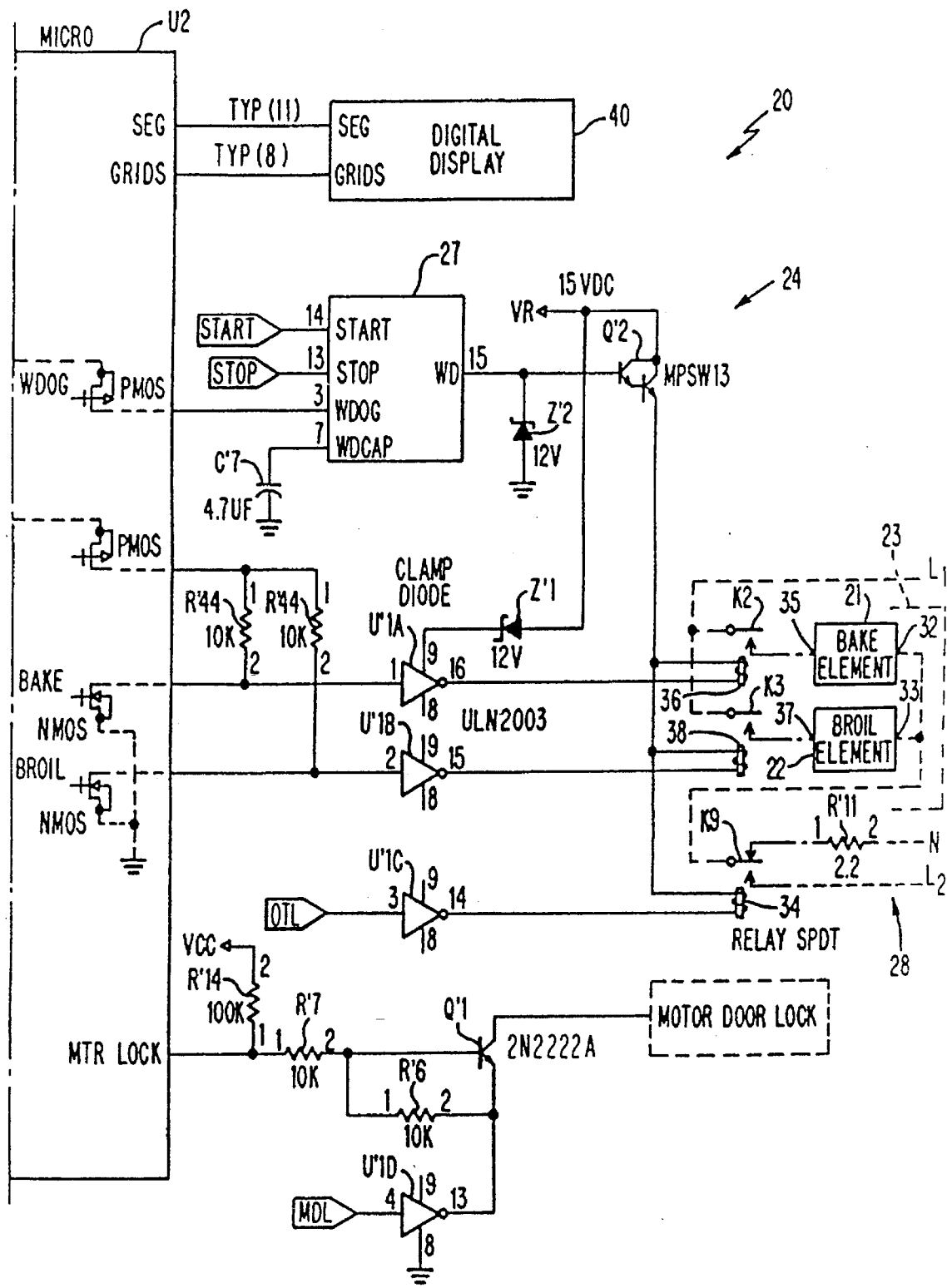

Referring now to FIGS. 2A and 2B that are to be placed together in the manner illustrated in FIG. 1, the entire control system of this invention is generally indicated by the reference numeral 20 and is being utilized to control the operation of a bake heating element 21 and a broil heating element 22 of a cooking apparatus 23 in a manner that is generally set forth in the Kadwell et al, U.S. Pat. No. 4,782,215 and the Fowler U.S. Pat. No. 5,029,244, whereby these two U.S. patents are being incorporated into this disclosure by this reference thereto.

Therefore, since the general operation of a cooking apparatus and the control of the heating elements thereof by a control system are well known in the art, only the parts of the control system 20 of this invention that are necessary to fully understand the features of this invention will be hereinafter set forth.

Figure 3:
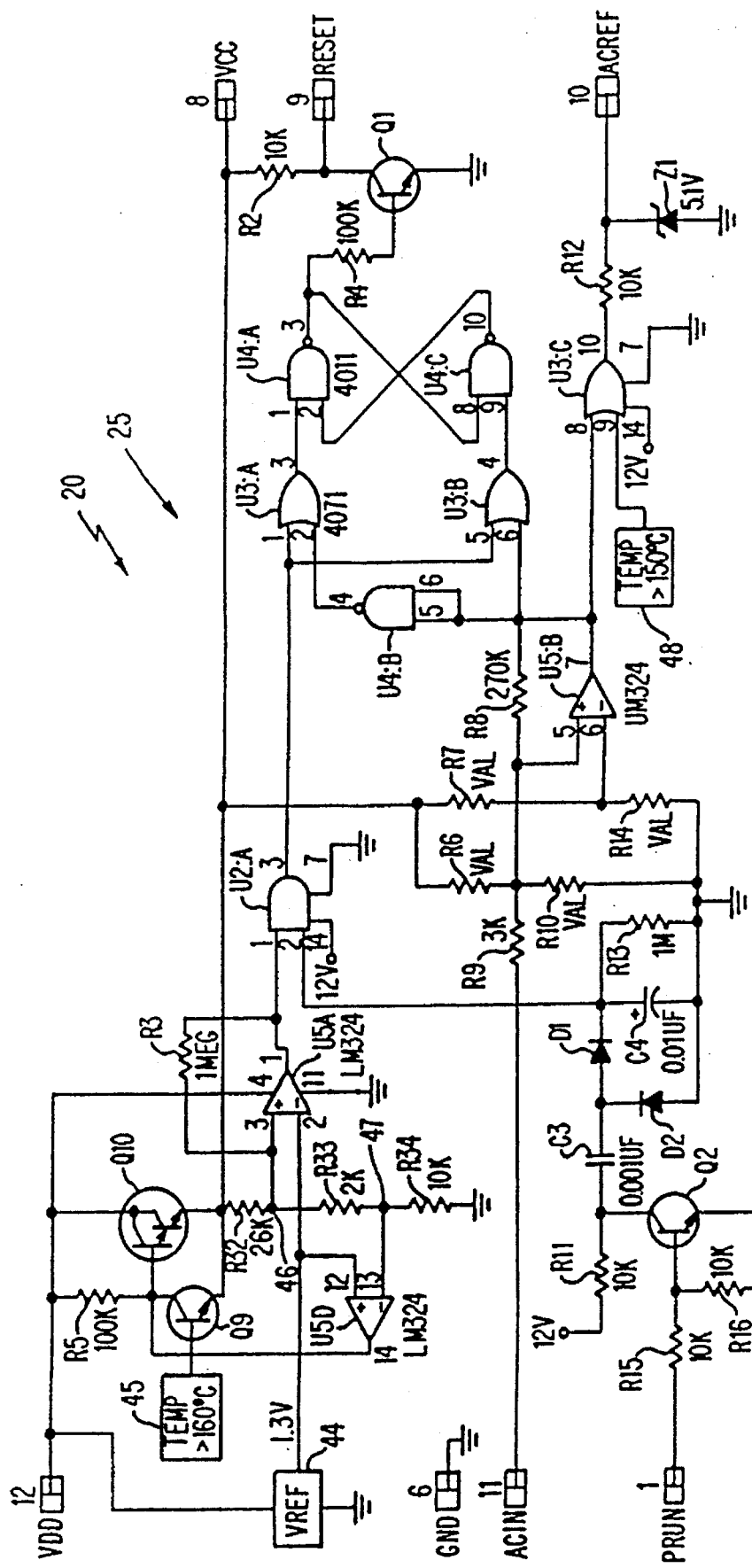
FIG. 3 is a schematic view illustrating discrete components and the electrical circuit interconnecting the same together to form part of the control system of FIGS. 2A and 2B.
Figure 4:
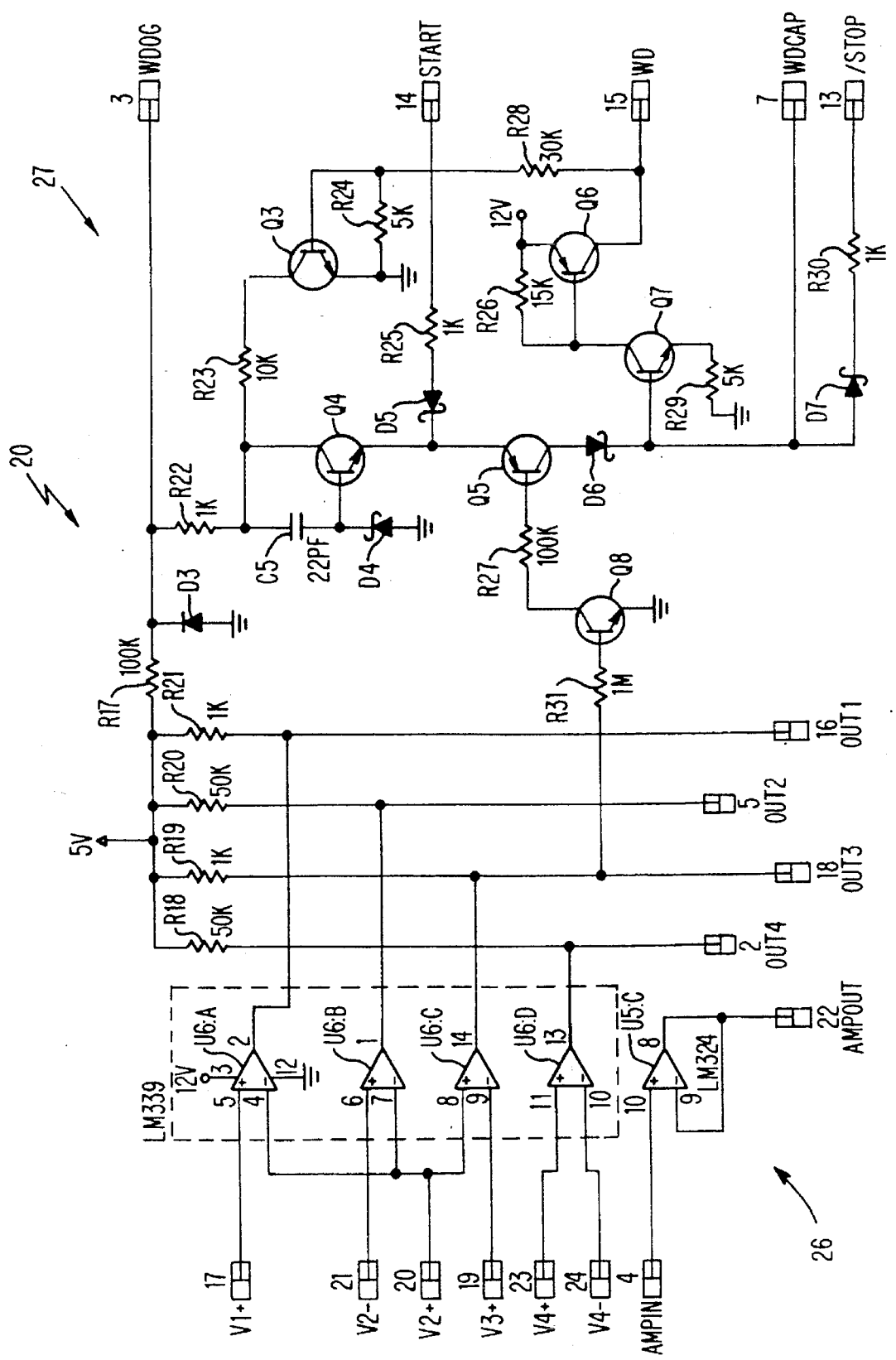
FIG. 4 is a view similar to FIG. 3 and illustrates the discrete components and the electrical circuit means interconnecting the same together to form other parts of the control system of FIGS. 2A and 2B.

Therefore, it can be seen from the drawings that the various components of an electrical circuit means 24 of the control system 20 of this invention are respectively given reference characters that are common in the art to represent the component, such as capital C for a capacitor, capital R for a resistor, capital D for a diode, capital Q for a transistor, capital Z for a zener diode, etc., with each capital letter thus being followed by a number to distinguish that particular reference letter from the others of a similar component and those components in FIGS. 2A and 2B that are disposed external to blocks or boxes 25, 26 and 27 thereof have the reference letter thereof followed by a prime mark to distinguish those components from the components that are disposed inside the blocks or boxes 25, 26 and 27 that are respectively illustrated in FIGS. 3 and 4 as will be apparent hereinafter.

In particular, FIG. 3 illustrates the various components and electrical circuit therefor that is contained within the box 25 of FIG. 2A whereas FIG. 4 illustrates the various components and electrical circuit therefor for the two boxes 26 and 27 of FIGS. 2A and 2B as will be apparent hereinafter.

The control system 20 has an external electrical power source of alternating current that is generally indicated by the reference numeral 28 in FIGS. 2A and 2B and comprises power soruce lines L1, L2 and N whereby the power source lines L1 and N as illustrated in FIG. 1 are connected to a primary coil 29 of a transformer 30 that has its secondary coil 31 electrically connected to pins 12 and 6 of the block 25 through respective diodes D'5.

The power source line L2 of FIG. 2B is adapted to be electrically interconnected to sides 32 and 33 of the bake element 21 and broil element 22 when a relay coil 34 of a relay means K9 is energized and the line N is adapted to, be interconnected to the sides 32 and 33 of the bake element 21 and broil element 22 when the relay coil 34 is not energized.

The other side 35 of the bake element 21 is adapted to be interconnected to the power source line L1 when a relay coil 36 of a relay means K2 is energized and to be disconnected from the power source line L1 when the coil means 36 is deenergized. Similarly, the other side 37 of the broil element 22 is adapted to be interconnected to the power source line L1 when the coil means 38 of a relay means K3 is energized and to be disconnected from the power source line L1 when the coil means 38 is deenergized.

The control system 20 has a RTD temperature sensor 39 that senses the output temperature effect of the bake element 21 and/or the broil element 22 during the operation thereof for heating an oven (not shown) of the cooking apparatus 23 whereby the control system 20 will tend to maintain the output temperature effect at a selected temperature that has been selected for the control system 20 in a manner fully set forth in the aforementioned U.S. patent to Kadwell et al and the aforementioned U.S. patent to Fowler.

The control system 20 comprises a microcomputer or microprocessor U2, a digital display 40 and various selector keys or switches, such as the start switch 41 and the stop switch 42 illustrated in FIG. 2A whereby after the desired cooking operation has been selected by utilizing various selector keys or switches that are generally indicated by the reference numeral 43 in FIG. 2A, the operator can press the start key 41 to turn on the control system 20 to tend to maintain the temperature output effect of the heating elements 21 and/or 22 at a selected temperature and that person can stop the selected cooking operation at any time thereafter by pressing the stop switch or key 42 all in a manner well known in the art.

The block 25 of FIG. 2A comprises a voltage regulator means for the system 20 of this invention and the parts thereof are illustrated in FIG. 3.

Referring now to FIG. 3, VDD is from the power source 28 and is an unregulated voltage somewhere around 12 volts DC. However VDD might wander between 7½ to 16 volts depending on time, temperature, conditions, loading, etc. Therefore, a reference voltage is generated at the block 44 labeled VREF from VDD, VREF basically being a band gap or a zener type regulator as is well known in the art. VREF generates a constant 1.3 volts which is stable with regards to temperature, time and loading and this reference voltage is used to build a 5 volt power supply VCC on terminal 8. An operational amplifier U5D compares the reference voltage 1.3 volts on its plus input 12 to a sample of VCC on its minus input 13. There is a voltage divider taken from VCC which is made of resistors R32, R33 and R34 so when the 5 volt supply is the correct voltage, there is 1.3 volts on the minus input 13 for the U5D. If the VCC supply rises slightly, such as towards 6 volts, then the resistor divider increases the voltage on the minus input 13. It is well known that if the minus input 13 on the operational amplifier U5D goes positive, the output 14 thereof goes negative. The output 14 of the operational amplifier U5D is connected to the base of a Darlington transistor Q10 and if the output is negative it tends to turn the transistor Q10 off which reduces the voltage on VCC to thereby restore the original 5 volts thereof. Likewise if the VCC is pulled low for some reason it causes the minus input 13 of the operational amplifier U5D to go more negative so that the output 14 of the operational amplifier U5D goes more positive and turns the Darlington transistor Q10 on more so that the voltage is raised on the output thereof. The base current for the transistor Q10 comes from resistor R5 and is a small current, something in the order of 25 to 50 microamps. Because the Darlington transistor Q10 has a fixed amount of gain, something like a thousand, the current that is supplied by resistor R5 is a small value and gets amplified. So, for example, if the resistor R5 is providing 25 microamps, that gets multiplied by 1,000 and there is approximately 25 milliamps of current at VCC. That limited amount of current means that the voltage regulator is short circuit protected. If VCC should somehow become grounded, the current that flows is limited and the transistor Q10 does not overheat or become damaged or destroyed.

A shunt transistor Q9 is provided for the voltage regulator of this invention and it shorts out the base drive to the transistor Q10. If transistor Q9 ever turns on, VCC will go to zero, and, therefore, force the voltage regulator 25 to turn off.

The control system 20 of this invention uses a temperature sensor means to control transistor Q9 so if the control system 20 is in an environment that is too hot, the voltage regulator thereof will be turned off and thereby all of the output loads of the system 20 must turn off. Should the temperature of the environment cool off, the system 20 would be brought back to a safe normal operating mode.

The block 45 of FIG. 3 comprises a temperature sensing means and the temperature sensing can be done by any means that is suitable for the application. There are mechanical snap switches or thermistors. The particular means that is used in one working embodiment of this invention is to run a constant current through a diode. A silicone diode has a forward voltage drop of about 6/10ths of a volt and that voltage decreases 2.2 millivolts per degree C. temperature increase. Thus, a simple circuit is used to sense the temperature in the area of the control system 20 where the block 25 is located and the temperature sensing procedure is well known in the industry and widely used in semiconductor circuits.

An operational amplifier comparator U5A is used to sense when VCC is too low. Thus, when the control system 20 is first powered up, VDD would of course be 0 volts and gradually rises toward its final value of 12 volts. VCC is also going to be too low initially and while coming up to its proper voltage, VCC is too low for proper operation, the system 20 makes sure that the external logic of the microprocessor U2 and such is held at reset thereof. Accordingly, the same voltage divider that comprises the resistors R32, R33 and R34 has another tap 46 a little higher up than the tap 47 thereof. If the supply voltage on the tap 46 and the plus input 3 of the operational amplifier U5A is below the reference voltage VREF then the system 20 will generate a reset as the output 1 of the operational amplifier U5A will be low. If VCC is below about 4.4 volts, the output 1 of operational amplifier U5A will be low. If VCC is above about 4.4 volts, the output 1 of the operational amplifier U5A will be high and the threshold is determined by the resistor string of the resistor R32 versus the resistors R33 and R34 and again this comparator U5A compares the reference voltage of 1.3 against the sample of VCC and the resistors are chosen so that around 4.4 volts is where the reset is detected.

Resistor R3 is a feedback resistor from the output 1 of the operational amplifier U5A to the plus input 3 of the operational amplifier U5A and the purpose of resistor R3 is that if the supply voltage VDD, for example, is decreasing because the AC power has been turned off or because there is a brownout or a low line condition, the resistor R3 will prevent a circumstance where the reset comes and goes in synchronism with the AC line. Thus, when VDD is right on the threshold value thereof, the output 1 of the comparator U5A would chatter so the feedback resistor R3 ensures that the comparator U5A will be in one state or the other, will latch there and not chatter back and forth when VDD is right near the threshold.

ACIN at pin 11 in FIG. 3 is a 60 cycle signal coming from the same power source 28 that is powering VDD at pin 12. However, VDD is the rectified version of that same AC signal. If the AC line voltage is normal, ACIN would be something on the order of 5 to 10 volts AC. That signal goes through a resistor R9 to the plus input 5 of an operational amplifier or comparator U5B. The minus input 6 of the comparator U5B is a voltage divider from VCC to ground made up of resistors R7 and R14. The resistor values of resistors R7 and R14 would normally be chosen to provide some hysteresis. If to begin with one ignores resistor R8 then the minus input 6 of comparator U5B is simply held at a voltage, such as 2½ volts which is one-half of VCC. Now as ACIN goes above and below that voltage, the output 7 of comparator U5B will switch hard between 0 volts and 12 volts. By adding resistor R8 the balance between resistors R8 and R9 adds hysteresis so that rather than a fixed 2.5 volts threshold, the threshold can be, for example, 1 volt and 4 volts. That helps reject noise. The AC line would typically not have just 60 cycles but also noise from sparks, lightning and motor surges when motors start and when loads get switched. By having hysteresis in the comparator U5B, this will eliminate most of this noise. In the particular working embodiment the thresholds were set to be near 0 and near 5 volts, so the values of the resistors R6, R10, R8 and R9, R7 and R14 are chosen to provide the particular thresholds and the particular amount of hysteresis that works best in a given application and that generally would have to be chosen to suit the application thereof.

In the case of a timekeeping product, the appliance control system 20 needs to keep track of real time and it is most convenient to use the AC power line 28 for that because the 60 cycle frequency thereof is regulated, it is actively corrected so that if it is a little fast, the power company slows it down and if it is a little slow, they speed it up so that a clock based on a 60 hertz is always accurate right to the second. Therefore, it is desired that the signal labeled ACREF at pin 10 in FIG. 3 is that same 60 hertz only squared up and cleaned up so that it is a nice clean square wave. The output 7 of the comparator U5B goes through an input 8 of an OR gate U3C. R12 and zener diode Z1 are provide simply to clamp the voltage level. OR gate U3C is powered by the 12 volt power supply VDD. Therefore, output 10 of OR gate U3C goes between 0 and 12. By having the resistor R12 and the zener diode Z1, ACREF goes between 0 and 5 volts. In this way one can drive the external logic (components of the system 20 that are external to the microcomputer U2) which is powered at 5 volts without giving it too much voltage.

OR gate U3C also has a second input 9 which comes from a temperature detector that comprises box 48 in FIG. 3. The temperature detector 48 is very similar to the temperature detector 45 in the voltage regulator that detects temperatures of 160° C. and above. However, temperature detector 48 detects temperatures of 150° C. and above. The two temperature detectors 45 and 48 are actually shared and sense the temperature at the same point where box 25 of FIG. 2A is located so that if the sensed temperature is rising, detector 48 will first detect that the temperature is greater than 150° C. When that output of detector 48 goes high, it forces input pin 9 of OR gate U3C high. With an OR gate, one high input means that the output of the OR gate must be high. Therefore, the output 10 of OR gate U3C is high and ACREF is high, near 5 volts. The microcomputer U2 senses ACREF and if it sees that ACREF is continuously high, that means that there is an overtemperature and such an overtemperature is a warning. Thus the microcomputer U2 has been warned of the temperature and it can shut things down in a controlled safe fashion before a shutdown occurs. If the microcomputer U2 is broken or damaged or in some other way refuses to respond to this warning, then when the temperature reaches 160° C., the detector 45 causes the voltage regulator to turn off so that VCC is turned off. Therefore, detector 45 removes all power from the system 20 so that the system 20 has a two-step synchronized backup. First there is a warning and then a shutdown if the system fails to take heed of the warning.

If the AC line voltage of source 28 is normal so that ACIN at pin 11 is swinging, such as at 10 volts AC, ACREF at pin 10 will then be switching high and low. One of the two thresholds, the one near ground, occurs right near the zero crossing of the AC line. As ACIN, in other words, reaches and crosses zero so as to go negative, ACREF will also go negative right at that instant. That can be used by the microcomputer U2 as a phase reference. Some types of controls are triac phase controls and use the zero crossing point on the AC line to make decisions as to when to turn things on or off, since minimum switching noise is provided if loads are switched right at the zero crossing. Thus, when ACIN is going more positive and as it crosses the threshold of around 5 volts, ACIN makes its decision for ACREF to go high. If the AC line voltage now is slowly reduced, such as when it started at 10 volts then it finally falls to 5 volts peak, ACIN will no longer go high enough so that the comparator U5B switches whereby the wave form at ACREF first would have been a square wave. It would have gotten narrower and narrower and finally it doesn't go high at all. So it stays permanently low. There is still AC power at that point. There may be 5 volts peak on ACIN but its not enough to power the control. The logic of the microcomputer U2 can detect the fact that ACREF has gone low and stays low and thereby the microcomputer U2 knows what the AC line voltage is doing. This is a means of detecting either a power fail or a brownout, and because the thresholds are well regulated, well controlled, it is known precisely what voltage at which those will occur. Therefore, the external parts on ACIN can be chosen so that the wave form just barely reaches 5 volts at the time it is desired for a shutdown to occur and that could be set to correspond to say a 10% low line voltage whereby the selected parts will provide a signal that the line voltage is 10% low.

Thus ACREF at pin 10 in FIG. 3 really is providing three functions for the system 20, namely ACREF provides an AC timing signal for phase control and for timing references like a clock, if ACREF goes permanently high it warns that an overtemperature is going to happen and if ACREF goes permanently low, it warns that the AC line voltage is too low for operation. Accordingly this is a triple use out of the same pin 10.

Referring now to pin 1 in FIG. 3, pin 1 comprises a PRUN which stands for processor running and is a signal coming from the microcomputer U2 or other external logic which tells the circuit of FIG. 3 that the logic of the microcomputer U2 is indeed functioning. If something happens, if the microcomputer U2 crashes or breaks or gets lost in its program somehow, the program for the microcomputer U2 is so written that there is a signal on PRUN, a changing AC signal on PRUN whenever the program is working and there is not a changing AC signal on PRUN when the program is not working. It does not matter too much what the pulse rate or the duty cycle or the frequency of the signal is as long as it is there on PRUN at pin 1. An AC signal on PRUN pin 1 goes into a transistor Q2. A resistor R15 is a current limiting resistor for the base of the transistor Q2. A resistor R16 is to simply ensure that the transistor Q2 turns off if the system 20 is at high temperatures. So the signal at the collector of the transistor Q2 is also a square wave switching the same, it is an inverted version of the signal at PRUN. This AC square wave is capacitively coupled by a capacitor C3 and rectified by diodes D1 and D2 and charges a capacitor C4. Therefore, there will be a DC voltage on the plus terminal of the capacitor C4 if there is an AC signal on PRUN. If there is no AC signal on PRUN, the capacitor C4 will be discharged by resistor R13 back to 0 volts.

It is well known that the sequence of events when a microcomputer is first powered up is a power-on reset and it is a rather complicated time. Many things are happening at once. The AC power is coming up but it is probably not immediately stable or reliable. The microprocessor itself has a clock circuit which has to start running and it might be a crystal or a resistor oscillator or a ceramic resonator. Crystal oscillators in particular are very slow to start. They may take several seconds after power is applied before they finally stabilize and are reliable and running at the correct frequency. Thus, a system must have means that detects when the microcomputer is stable and operating and the processor must be reset when it is not. Microprocessors also come in two versions. Some of them require an active high reset signal. Some require an active low reset signal. Microprocessors are often fussy about reset in that they insist that it must have a sharp rising edge so that it is solidly high and they often require that when it goes low it be a sharp sudden edge and that it stays solidly low. The microprocessors do not want signals that are mushy, that slowly make a transition from one state to the other or they do not want signals that change for just a few microseconds and then revert back to the other state. If any of these things happen the reset sequence inside the microcomputer is unreliable and one does not know if it works right. If the reset is unreliable one cannot count on the micorprocessor to perform its program properly. Therefore, another feature of the circuit of FIG. 3 is to always generate a reset signal which is solidly high or low, one that never makes a transition suddenly from one state to the other without a long enough pause to satisfy the microcomputer U2 and will always reset the microcomputer U2 if the power supply 28 is bad or if the processor run signal, PRUN, indicates that the process is not running.

When electrical power is first applied at VDD pin 12, VCC at first is too low for proper operation, such as being at only 4 volts. The output of comparator U5A will be low. At the same time, since the microprocessor U2 is not running, there is no PRUN signal at pin 1. Therefore, the capacitor C4 will be discharged and both input pins 1 and 2 of an AND gate U2A are both low. Therefore, the output is low on pin 3 of AND gate U2A and that low signal is fed to inputs 1 and 5 respectively of OR gates U3A and U3B. It is well known that the output of an OR gate is high if either of its inputs is high. In this case, the inputs are low so it does not do anything to make the outputs of the OR gates U3A or U3B change state. The remaining input pins 2 and 6 respectively of OR gates U3A and U3B, are fed from the ACIN signal at terminal 11. Assuming that AC is present at this time, the output of the comparator U5B is a square wave going first low and then high for about 8 milliseconds each. That gets inverted by an AND gate U4B so that input pin 2 of OR gate U3A is going low, then high. The input pin 6 of OR gate U3B is going high, then low—the exact opposite. This means that the output 3 of OR gate U3A is first high, then low. The output 4 of OR gate U3B is first low, then high so that the OR gates U3A and U3B are toggling back and forth and are opposites of each other. AND gates U4A and U4C form a bistable latch in that one or the other of the outputs 3 or 10 thereof is turned on. Thus, when a low is on input pin 1 of the AND gate U4A and then a low is placed on input pin 9 of the AND gate U4C, the output of the latch will toggle back and forth to follow it. Therefore, output pin 3 of the AND gate U4A is a square wave at the 60 hertz line frequency going first high and then low and this drives the base of a transistor Q1 through a resistor R4 so that the reset signal at RESET pin 9, is going first high, then low, i.e., RESET is oscillating high and low at a 60 hertz rate. One feature of the circuit of FIG. 3 is that it doesn't matter which of those two states is the reset for the microprocessor U2. One of the two will be a reset so that for 8 milliseconds, the external logic is reset, then for 8 milliseconds, it is freed and allowed to run. This will continue as long as VCC is too low. As the power supply rises and the filter capacitors charge, eventually VCC will be good. At this point, input pin 1 of the AND gate U2A now goes high indicating that VCC is good but because the microcomputer U2 at that instant may or may not be free to run, and if microcomputer U2 is not free to run, that state of reset happens to be holding the external logic in reset whereby there will be no PRUN signal, the capacitor C4 will still not be charged. Therefore, the input pin 2 of the AND gate U2A is still low and this cycle of reset changing every 8 milliseconds continues so the reset line will toggle one more time, such as from high to the low state. Should the particular microcomputer U2 be one that allows it to run if the RESET signal is low and at this point the VCC is good, the microcomputer U2 is free to run so it begins generating the PRUN signal which charges the capacitor C4 as described before and the input pin 2 of the AND gate U2A goes high. Now both inputs 1 and 2 of the AND gate U2A are high so that the output 3 thereof is high. This means that one input of the OR gate U3A went high so the output 3 of the OR gate U3A is always high. It also means that OR gate U3B has one input high so its output 4 is high. 5 The AND gates U4A and U4C now have a high on both input pins 1 and 9 thereof. A high on this type of a latch means that whichever state it was in at that time, it stays in that state and it can no longer toggle with ACIN. Therefore, whatever state RESET is in, in this case we have said low, RESET stays in that state so the microprocessor U2 is now running and the circuit can continue in this state as long as both VCC is good and the PRUN signal is present. If either the power goes too low, goes bad, etc. or if PRUN goes away, this cycle will repeat and the reset line will begin toggling back and forth between the two states. Now the timing through the choice of values for the capacitors C3 and C4 is important. These values need to be appropriate for the frequency of the pulses that are coming out on PRUN. If PRUN is too slow or the values of the capacitors C3 and C4 are too large or too small, you will not generate the PRUN signal at all. It is a balancing act. Since the microcomputer U2 is being reset for 8 milliseconds and then free to run for 8 milliseconds, during the 8 milliseconds when it is running the microcomputer U2 must generate a frequency on PRUN that is significantly faster than the 60 hertz. If the frequency on PRUN is too low, then the capacitor C4 will not charge fast enough. If the capacitor C4 does not charge fast enough even though the microprocessor U2 is running, another reset will occur. Conversely, if the frequency on PRUN is too high, the time constant of the resistor R11 and the capacitor C3 would not properly charge. So there is a balancing act that must take place between the values of the capacitors C3 and C4, the resistors R11 and R13 and the frequency and wave form generated on PRUN. It is the programmer's responsibility to assure that they have a system that is reasonable and stable over the operating range to be expected. For example, it was found that when PRUN was at 60 hertz and the capacitors C3 and C4 had values of 0.01 UF and 0.1 UF, the capacitor C4 would not charge fast enough. However, it is believed that if PRUN has a frequency of 1000 hertz and the capacitors C3 and C4 have values of 0.001 UF and 0.01 UF as illustrated in FIG. 3, the capacitor C4 will charge fast enough so that if the microprocessor U2 is running, PRUN will be created so that RESET will remain in that state that caused the microcomputer U2 to begin to operate.

While some systems just hang an RC network onto the RESET pin in the microcomputer, an RC network is not used in system 20 of this invention because RESET on pin 9 only changes state on the zero crossing of ACIN. The RESET pin 9 is going to be high for a full 8 milliseconds, nothing else, and the RESET pin 9 is going to be low for a full 8 milliseconds, nothing else whereby microsecond wide reset pulses cannot be obtained. Also because the system 20 uses a latch driving the reset line, there is always a sharp edge, i.e. a submicrosecond rise and fall time on the RESET pin 9. In addition, there are no parts in the circuit of the invention that can fail and cause RESET to produce these kinds of substandard signals. There is no RC network, for example, that is determining the reset timing. If, for example, the microcomputer U2 has a crystal controlled clock and that crystal takes a long time, several seconds, to start running after power is applied, the circuit of this invention will continue to reset the microcomputer U2 on a 50% duty cycle for that entire several seconds or for as many seconds as are necessary until that oscillator starts. If the oscillator starts and then for some reason stops, that will cause the PRUN signal to go away and cause a reset so the circuit of this invention is a true watchdog that watches what the microcomputer U2 is doing and will generate a RESET signal any time the microcomputer U2 is nonfunctioning. Also, the reset output in the circuit of this invention is not a logic level whereas most people would think of reset as being high or low. In the circuit of this invention there are two states but the two states are oscillating and stable, and when it is stable it can be either high or low depending on the microcomputer U2. If RESET happens to stop in the wrong state it will simply hold the micro reset and there will be no PRUN. However, there will then be another reset and it will toggle to the opposite state and try that.

As previously set forth, it was described that when power is first applied to the system 20, a reset signal is generated and that the comparator U5A is detecting when the VCC is below 4.4 volts. However, now consider the reverse case. If there is a failure of the AC power, what will happen is that first the VCC will remain stable as VDD falls. VDD which began at 12 volts and is now falling to 11, 10, 9, 8, 7 volts as the filter capacitors of the system 20 lose their charge and run down. When VDD is somewhere around 7 volts, the voltage regulator can no longer control VCC and the Darlington transistor Q10 is saturated and cannot do any more to keep VCC up. At that point VCC begins to fall and a reset signal is provided when VCC falls to 4.4 volts. However before that point, as VDD was falling and as the AC power line was failing, the ACIN signal will go away first. Taking, for example, if the nominal VDD is 12 volts, then the peak transformer secondary must be 12 volts so that the RMS value is somewhere around 8 or 9 volts. As that voltage falls, the components on ACIN have been so chosen so that it quits working before VDD falls below 7.5 volts so an AC voltage that corresponds to VDD equals 7.5 volts and causes ACIN to stop going high, i.e., stop going above 5 volts. When that happens, ACREF will go low and stay low. This warns the microcomputer U2 that a power failure is impending. It is coming and if VDD continues to fall then a reset will occur so the sequence of events is first, ACREF will go low and stay low, then a reset will occur so the microcomputer U2 is first warned of a power failure and the microcomputer U2 has time to turn things off, save information in nonvolatile memory, do whatever kind of orderly shutdown the product application requires before there is a complete shutdown of the system 20.

As previously described, the same situation happens with the temperature being sensed by the blocks on detectors 45 and 48. First there is a warning in that ACREF goes high at 150° C. sensed by block 48. If the temperature continues to rise then you get a shutdown when block 45 senses 160° C. However, the microcomputer U2 at the 150° C. temperature warning has time to turn things off, save information in its memory, etc. before the complete shutdown when the 160° C. temperature is reached.

It is known to provide a power-on reset circuit that generates both active high and active low reset signals, but the same utilized two separate pins and two separate circuits to provide that function. In contrast, the circuit of the invention as previously described, provides a power-on reset circuit that works without change for external logic of either polarity (active-high or active-low reset inputs).

It is another feature of the system 20 of this invention to provide a watchdog circuit that resets external logic if the logic ceases to function with the watchdog circuit not being disabled or defeated due to any open or shorted components, any open pins or pins shorted to each other, etc.

In particular, the previously mentioned PRUN circuit resets the microcomputer U2 if any kind of a fault occurs. However, it is also possible for the microcomputer U2 to have failed such that nothing can be done to the reset thereof or to its power supply to restore proper operation. The microcomputer U2 is simply broke and will never operate again. For a safe appliance one has to be sure that even if that happens, if the microcomputer fails, one can almost guarantee that the outputs will be turned off. The output loads could not be enabled. In the system 20 of this invention the relay means K2 and K3 which energize the external loads 21 and 22 have two paths for power. The microcomputer U2 controls the low side drivers U'1A and U'1B of FIG. 2B for the relay means K2 and K3 and the supervisory watchdog circuit of FIG. 5 controls the high side drivers Q'2 of FIG. 2B for the relays K2 and K3 as both the low side and the high side must be enabled for any relay means K2 or K3 etc. to be turned on.

A preferred interpretation of the UL regulations is that a physical pushbutton entry is desirable to start a bake cycle on an appliance. In the system 20, this is handled by the START pin or terminal 14 shown in FIG. 4. The sequence of events would be as follows. Start is the pushbutton switch 41 in FIG. 2A that is connected to VCC. When switch 41 is closed, the start cycle is high on START pin 14 of FIG. 4 and current flows through a resistor R25 and a diode D5 to the emitter of a transistor Q5. The base of the transistor Q5 would normally be grounded or a current would be pulled out of the base of the transistor Q5 by a resistor R27 and a transistor Q8 as long as an overtemperature condition did not exist. Therefore, assume first that the oven temperature is not excessively hot in which case the transistor Q5 has the base current thereof turned on. Therefore, the high signal from START goes through resistor R25, diode D5, transistor Q5 and diode D6. The diode D6 is connected to the WDCAP pin 7 which has a capacitor C7 (FIG. 2B) connection to ground. The current flowing through the previously mentioned path charges the capacitor C7 on WDCAP. When the voltage of the capacitor C7 is high enough, approximately 1.2 volts, the base of a transistor Q7 begins to conduct. Current flows in the base of the transistor Q7 and out the emitter thereof through a resistor R29 to ground. This causes a collector current to flow in the transistor Q7 and this current will be high enough that it begins to turn the transistor Q6 on. There will be enough collector current that develops, more than 6/10ths of a volt across a resistor R26 so that the transistor Q6 will turn on. Therefore, the collector of the transistor Q6 will go high. This causes the WD pin 15 to be high and that is what powers the high side of the relay drivers. A zener diode Z'2 (FIG. 2B) clamps this voltage so that the voltage cannot rise above approximately 12 volts. When there is a high on WD, the 12 volt signal there goes through a resistor R28 and a resistor R24 to ground. The resistors R28 and R24 are from a voltage divider so that there will be a couple of volts trying to be present on the base of a transistor Q3. The base emitter junction of the transistor Q3 will therefore be turned on and clamp this voltage to ⁶⁄₁₀ths. So the transistor Q3 is turned on and its collector goes low. The WDOG pin 3 is a signal from the microcomputer U2. The same START button 41 that caused the previously mentioned actions was also being sensed by the microcomputer U2 and therefore the microcomputer U2 also recognizes that there is a request to do a bake operation and the microcomputer turns on relay driver U'1A on the low side thereof. The microcomputer U2 also begins generating a square wave of approximately a 1 kilohertz signal on WDOG. Inside the microcomputer U2 is a transistor that can only source current from VCC and it functions like a switch. It is closed half the time and opened the other half of the time. During the half of the time that WDOG is connected to VCC by the microcomputer U2, WDOG is pulled high. This high signal flows through a resistor R22 to the collector of a transistor Q4 and the instant when this occurs, a capacitor C5 allows a small pulse of current to flow so the rising edge of the watchdog capacitor C5 carries a small pulse of current into the base of the transistor Q4 whereby the transistor Q4 is turned on. The collector of the transistor Q4 which was high is near 5 volts so the base of the transistor Q4 is near 5 volts and the emitter of the transistor pulls near 5 volts.

However, before the pushbutton switch 41 is activated the WDOG pin 3 in FIG. 4 would normally be high as WDOG is pulled up to 5 volts by a resistor R17. Since this is a DC level, there is no current in the capacitor C5 so there is no base current for the transistor Q4 so the transistor Q4 is turned off. The START pin 14 is also disconnected from power as the pushbutton switch 41 is opened and there is no current flowing through the resistor R25 or the diode D5. The transistor Q5 would normally be turned on if the oven temperature is reasonable. The OUT3 pin 18 of a comparator U6C is normally high which indicates that oven temperature is acceptable, i.e. it is not too hot. A high on pin 18 of OUT3 provides base current through a resistor R31 to a transistor Q8 so transistor Q8 is turned on. That means it is pulling collector current into the transistor Q8 which causes base current for the transistor Q5 to flow through a resistor R27 so therefore the transistor Q5 was normally turned on. However, since the emitter of the transistor Q5 has no source of current, neither the diode D5 nor the transistor Q4 has any current and even though the transistor Q5 is on there is no collector current. This means there is no current in the diode D6 and the WDCAP pin 7 which has the capacitor C7 to ground will have no source of charging current. The leakage current, any voltage that was present on WDCAP, would have bled off by going in the base of transistor Q7 and out its emitter through the resistor R29 to ground. So this is the initial condition of the watchdog circuit of FIG. 4. Since the transistor Q7 is off there is no collector current so there is no base current in the resistor R26 or the transistor Q6. Therefore, the transistor Q6 is turned off and, thus, the WD pin 15 is low. Since the WD pin 15 is low, there is no current flowing in the resistor R28 or the resistor R24 and the transistor Q3 is off so there is no collector current in transistor Q3 nor any current through the resistor R23 or the resistor R22. Therefore, WDOG is high through the resistor R17, to 5 volts.

Now assume that a user presses the START button 41 which shorts the START pin 14 to VCC. Current now flows through the resistor R25, through the diode D5, through the transistor Q5, which is on, through the diode D6 and into the watchdog capacitor WDCAP pin 7 whereby the capacitor C7 will charge rapidly because it is a fairly low resistance path and the current is moderately high. When this voltage on WDCAP reaches about 1.2 volts, the transistor Q7 will be turned fully on. The current flows in its base and out its emitter to ground through the resistor R29 and the collector of the transistor Q7 will draw current. This current flowing through the resistor R26 will generate enough voltage drop to turn the transistor Q6 on so that the collector of the transistor Q6 will therefore source current into WD and WD will go high. The zener diode Z'2 (FIG. 2B) on WD prevents WD from rising above 12 volts. At this point WD is 12 volts whereby current will flow through the resistor R28 and through the resistor R24 to ground. This will bias the base of the transistor Q3 on and when the transistor Q3 turns on, its collector is pulling current to ground through the resistor R23. Therefore, the WDOG pin 3 is now being pulled low as current will be flowing through the resistors R17, R22 and R23 and through the transistor Q3 to ground. The microcomputer U2 would have sensed that the START button 41 was pressed and it also senses that WDOG was high and just went low. That is the condition that microcomputer U2 needs to accept that the watchdog circuit is connected and functioning and has recognized the start and turned on. At this point the user would normally release the START button 41. If nothing else happened, the charge in the capacitor C7 on WDCAP would gradually run down and within a few seconds WD would return low. Inside the microcomputer U2 there is a transistor between WDOG and the 5 volt VCC. The microcomputer U2 periodically turns that transistor on and then off, on and then off. During the time that it is turned on, it forces WDOG high. Current will flow from that high on WDOG through the resistor R22, through the capacitor C5, through the base of the transistor Q4 into its emitter. Because the transistor Q4 has a gain of several hundred this small current flowing through the capacitor C5 is converted into a much larger current into its collector and a larger, stronger current pulse flows from the emitter of the transistor Q4 than flows through the transistor Q5 which is still turned on because the oven is not too hot, through the diode D5 and provides a pulse of current to charge WDCAP. After a moment, the capacitor C5 is fully charged so it turns off and this path is then broken after a moment. However at this point, WDOG would be open circuited again by the transistor of the microcomputer U2. If WD is turned on, then current still flows through the resistors R28 and R24 to ground, and since the transistor Q3 is still on, WDOG is pulled back low again by the resistors R22 and R23 and the collector of Q3 to ground. In this manner, the wave form on WDOG is a square wave. The microcomputer U2 pulls WDOG high for a few microseconds, then releases it. WDOG goes low for a few microseconds, then the microcomputer U2 pulls it back high again. In this manner, the microcomputer U2 is checking for that low on WDOG each time and if that low is present it means that WD is still turned on. If WDOG stays high during that time it means that for some reason WD has gone low or something in the watchdog has failed. So WDOG is constantly cycling high and low, high and low. On each rising edge, a pulse of charge flows through the capacitor C5, turns on the transistor Q4 and provides a much larger pulse to charge at WDCAP. On each falling edge of WDOG, the capacitor C5 is discharged by current from ground through the diode D4, the capacitor C5, the resistor R23 and the transistor Q3 to ground. This charge/discharge cycle is what keeps the watchdog capacitor C7 on WDCAP charged.

The cooking cycle described above can be turned off in several ways. One way is that if the oven has an overtemperature condition OUT3 would have gone low. That would have turned off the transistor Q8 which in turn turns off the transistor Q5. That breaks the charging path so that now WDCAP cannot continue to be charged. It will gradually run down and the oven will be forced to turn off. The second way is that the user can press the STOP key or pushbutton 42 which will ground STOP pin 13. The charge on WDCAP is, thus, shorted out. The charge flows from WDCAP through the diode D7, through the resistor R30 to the STOP pin 13 and then to ground. This forces WDCAP to zero which forces the transistor Q7 to turn off. The transistor Q6 turns off and WD goes low disabling all of the relay means. The third way is that the microcomputer U2 can decide on its own to turn off the oven. If it does, it simply stops generating square waves on WDOG. The capacitor C7 will again run down on WDCAP until it turns off. The advantages of this circuit are that a component failure anywhere in the circuit, any component either shorted or opened, is detectable by the microcomputer U2 and will result in turning off the WD pin.

A comparator U5C is one section of an LM324. By connecting the minus input 9 thereof to its own output 8 it becomes a gain of 1 buffer amplifier. Whatever voltage is applied to AMPIN pin 4 is copied onto AMPOUT pin 22. The advantage of this is that AMPIN has a negligible loading. It draws very little or no current whereas AMPOUT can sink or source a considerable amount of current.

The four other comparators, U6A, U6B, U6C and U6D, are used in a bridge circuit to sense the temperature of the oven of the cooking apparatus 23. The platinum RTD device 39 is placed in the oven cavity which converts temperature into a resistance. By placing that RTD resistance 39 in a bridge circuit and comparing it against reference resistance the oven temperature can be obtained.

The platinum RTD sensor 39 for sensing oven temperature has a nominal resistance of 1K at 0° C. and increases its resistance by approximately 2 ohms per degree F. With this type of sensor 39, it is easiest to run a constant current through it. If, for example, one runs one milliamp through sensor 39 and it changes 2 ohms for a degree F. change, then one will have a 2 millivolts change in the voltage drop across the sensor 39. Because it is a constant current, this 2 millivolts per degree F will hold true no matter what temperature you are at. So by running a constant current through the sensor 39, one can convert temperature into millivolts directly. It would be a direct linear response. To generate such a constant current through the sensor 39, the microcomputer U2 is utilized. Referring to FIG. 2A, a resistor R'20 sets the basic current that flows through the sensor 39. Going down from VCC in FIG. 2A, through the resistor R20, through the RTD sensor 39, through a resistor R24, through a resistor R50 and into the AMPOUT pin 22, the output of the buffer U5C. The microcomputer U2 knows the voltage drop across the resistor R'20. R'20 being a fixed 1K resistor. For 1 milliamp there will be exactly 1 volt drop across resistor R'20. To sense that 1 volt, the voltage on R'20 is measured through R'21 to the pin 21 (V123- in FIG. 2A) which goes to the comparator U6B. The plus input 10 of buffer amplifier U5C is connected to an RC network comprising resistor R'19 and capacitor C'11 as illustrated in FIG. 2A. Assuming for a moment that the current through the RTD sensor 39 is exactly 1 milliamp, then the voltage across the resistor R20 is 1 volt. If VCC is 5, then there are 4 volts on V123- and the plus and minus inputs of the comparator U6B are both at 4 volts. If the current through the resistor R20 for some reason decreases slightly, then the voltage on V123- will rise slightly. So the minus input of the comparator U6B rises a little bit. That makes the output OUT2 go drastically low. Because the comparator U6B is used as a comparator even a 1 millivolt change causes the outlet to slam all the way to the negative rail right near ground. The microcomputer U2 senses that OUT2 went to ground and that means too low so it takes one of its output pins and drives that output pin low for a controlled pulse duration. The resistor R19, therefore, has one end grounded and the capacitor C'11 will be discharged by the pulses through the 200K resistance R'19 and the AMPIN pin 4 so that the plus input of the buffer amplifier U5C will fall. As the plus input of buffer amplifier U5C falls, the output 8 of buffer amplifier U5C falls. This causes the voltage on one end of the RTD sensor 39 to fall which therefore pulls more current through the resistor R20 so a closed loop system is provided. The microcomputer U2 will therefore make the output that is driving the resistor R19 go high, low, high, low, high, low so as to keep the average value of V123- exactly at 4 volts. This thereby means that it is a constant current through the RTD sensor 39. This also means that the voltage and AMPOUT will vary directly proportionally with temperature. If the RTD sensor 39 increases 2 ohms in resistance, the voltage on AMPOUT must go down 2 millivolts to compensate so that it can keep the voltage drop on the resistor R20 at the 1 volt. The microcomputer U2 can therefore take the duty cycle at the controlled high and low pulse duration that it is applying to the resistor R19 and compute from that what the temperature is.

In previous implementations the comparator U5C was an inverting amplifier. Therefore, it needed two equally matched resistors, one going from its minus input to its output, one going from the minus input to the pulsing output from the microcomputer. While this was feasible and it worked, the illustrated system 20 is a simpler implementation because it eliminates the two resistors and the matching requirement between them. A buffer amplifier wired as shown has an almost perfect voltage gain of plus 1 to several significant digits whereas with an amplifier of minus 1, the accuracy of that minus 1 is a function of how good the resistors are and resistors of better than about 1% tolerance start getting expensive so this is a less expensive implementation of the circuit.

Another advantage of this is that the parts of the circuit of this invention are all operating with a 5 volt power supply. Previous implementations required that the op amps and comparators were powered at 12 volts or some voltage significantly higher than 5. With this circuit the inputs and outputs of the comparators are operating at significantly less voltage than VCC, 4 volts or less, and modern op amps and comparators are designed so that they can operate best from 0 to a voltage somewhat less than their positive power supply. This arrangement of the circuit fits better with the way modern parts are designed.

The system 20 of this invention also senses absolute temperatures for detecting if the oven is hotter than normal bake temperatures, such as for a self clean operation. This is done with a bridge circuit. One leg of the bridge circuit comprises the resistor R20 and the RTD sensor 39 and incidentally the resistors R24 and R50. For the other leg, consider for example the door lock OUT1. In this case it doesn't matter what voltage is present on AMPOUT. One could assume any voltage as long as it was the same or less than VCC. So the two legs of the bridge are sampled by the comparator. The leg with the resistor R20 and the RTD sensor 39 is sensed by V123-. The other leg (not shown) is sensed by the plus input of the comparator U6A and comprises a resistor connecting to VCC and another resistor connecting to AMPOUT pin 22. When the temperature rises above the ratio set the OUT1 output 16 will change state. For temperatures above approximately 550° to 600° MDL will go low. For temperatures below 550° to 600° MDL will be high. This will be true regardless of the voltage on AMPOUT. Since the voltage on AMPOUT is determined by the microcomputer U2 this means that it is not necessary to know whether the microcomputer U2 is functioning or not. These temperature limits still work. An enhancement of this circuit would be for a case where AMPOUT becomes accidentally shorted to VCC in some fashion. If a small offset voltage was added to the plus input of comparator U6A, some tens of millivolts added to it, this would ensure that the comparator output will be off if the bridge circuit loses excitation and AMPOUT is shorted to VCC.

The comparator U6C functions essentially the same as the comparator U6A and comprises a resistor from the + input of U6C and another resistor to the AMPOUT pin 22. This provides a voltage divider for the unlocked oven door over temperature limit. A third resistor is connected from the + input of U6C to the lock sensor pin 19 which connects to the emitter of Q'3. When the oven door is locked the emitter of Q'3 connects lock pin 19 to VCC.

Transistor Q'3 is a PNP transistor wired in inverted mode. This basically means that its collector and emitter are interchanged but it still functions like a transistor. The inverted mode has the advantage that when the transistor Q'3 is turned on it has a much lower saturation voltage so that the collector emitted voltage when saturated is lower than it would have been if the transistor Q'3 was used normally. The disadvantage is that the gain of the transistor Q'3 is much lower, maybe 1/100th of the voltage gain, but that's not important in this circuit.

From a noise filtering perspective, the resistor R50 and the capacitor C12 form a noise filter. Their purpose is that the RTD sensor 39 is usually connected at the end of long wires and bundled in with wiring harnesses along with AC power wiring and has a significant amount of noise on it. The resistor R50 and the capacitor C12 tend to suppress that noise from coming back into the electronics. Likewise the resistor R21 and the capacitor C16 serve as a noise suppressor for noise coming back into the V123- input.

In most appliance controls the relay means are the largest power consumers. Almost all of the capacity of the power transformer is going into the relay means so anything that can be done to reduce the power consumption of the relay means reduces the size of the power transformer needed and thus its cost. Also anything that reduces the power consumption in either a transformer or a relay means reduces the temperature rise within the control and thus allows it to operate it in hotter environments or extends its reliability and life in a given environment. Normally the relay means are powered from an unregulated voltage simply because that is the cheapest and simplest kind of power supply. But this means that a relay means has to withstand overvoltage. For example when the AC line is high or if a power supply is sized to power several relay means when only one relay means is on, it gets more voltage than it would have otherwise gotten. So there is a balancing act between how high the voltage must be so that you can power all the relay means and yet not provide too much voltage such that it would overheat or burn up a single relay means.

In the control system 20 of this invention a semiregulated power supply is provided for the relay means. In particular, the 12 volt zener diode Z'2 and a Darlington transistor Q'2 are provided as illustrated in FIG. 2B. The relay means K2 and K3 have high side drivers. The most positive side of the relay coils 36 and 38 are powered by the single Darlington transistor Q'2. In a normal unregulated control this transistor would simply be turned fully on or fully off depending on whether the relay means K2 and K3 were supposed to be on or not. In this invention the zener diode Z'2 is added to the base of the Darlington transistor Q'2 that clamps this voltage. For example, if 9 volt relays are being used and the nominal power supply is 12 volts, this 12 volt supply can vary from 7.5 at its lowest to about 16 volts at its highest. Sixteen volts on a 9 volt relay is too much. This would cause the relay's coil to overheat. Therefore you could not use it in a very high ambient temperature. A 12 volt zener clamps the relay voltage so that under nominal conditions the relay is getting about 10 volts. This is a little higher than normal but not enough that it overheats the relay. If the AC line voltage then drops 10%, this 10 volts becomes 9 volts and the relays still have enough voltage and they still operate normally but if the line voltage rises 10% the voltage on the relay coils will not rise above 10 volts. It will be stuck at 10 volts because the zener diode Z'2 will begin to conduct and it will not allow the Darlington transistor Q'2 to turn on any further. The benefits of this are that as the line voltage rises either due to the transformer's regulation or AC line voltage rising, no more relay current is drawn as line voltage rises. The relay current is fixed so the relays K2 and K3 do not get as hot. This also means that the power transformer 30 does not need to supply as much current. The load on the secondary 31 of the transformer 30 would normally have gone up 10%. If it had to deliver 10% more current, the voltage went up 10% and the transformer 30 would have to be sized to deliver that extra power. In this case the transformer 30 can be 10% smaller and still satisfy the needs of the product. Also the regulation of the transformer was formerly a problem. If you have a control with many relays, the transformer delivers a different voltage with only one relay energized as it would with all of the relays. This is the transformer's regulation and in an unregulated power supply you generally need a good enough power transformer so that it only shifts voltage 5% or 10% from no load to full load. Otherwise if you get enough voltage with all of the relays pulled in you will have too much voltage when only one is pulled in. With the semi-regulated supply of this invention, the relay voltage is fixed regardless if there is one or all of the relays are turned on so the transformer 30 can have much poorer regulation characteristics. Its voltage can change much more between one and all of the relays. These two factors then reduce the size and cost of the transformer 30, reduce the temperature rise in the transformer 30 and relays K2 and K3 and therefore make the control cheaper and more reliable. There is a balancing act though. If the relay voltage is regulated too well, then the regulator itself becomes more complicated and expensive and dissipates more heat than what it is saving and in this case, it is counterproductive. For example, if the power supply varies as high as 16 volts and one tries to regulate exactly 9 volts on a 9 volt relay, the series pass regulator transistor would have to absorb the 16 minus 9 or 7 volts at the full relay current. This would cause the transistor itself to get quite hot. Accordingly, it would require either a physically larger transistor or a heat sink on the transistor both of which increase its costs. If the relay's voltage is allowed to rise somewhat to say, from 9 to 10 or 11 volts, this reduces the heating in the series pass transistor and therefore keeps the cost within reason.

An additional benefit to having a watchdog circuit on the reset line of this invention is that if there is any kind of a transient noise or electrostatic discharge condition, it can crash a microcomputer so that essentially it is scrambled and is no longer operable. It may be a safe condition but it is nevertheless annoying because the display will be frozen and none of the buttons are working and so forth. When the microcomputer U2 does this it will cease generating the PRUN signal. The logic in FIG. 3 however will generate a reset and restore the microcomputer U2 to normal operation. The microcomputer U2 may have lost information, such as the time of day or forgotten that the system 20 was in a cooking operation, but at least the control is operable and hitting the keys will again work. It will not require that the range be unplugged to generate power on reset and restore operation.

A second advantage of the watchdog of this invention is that it will reset the microcomputer U2 any time that it is necessary, not just on power on. There are certain conditions for which the microcomputer U2 can deliberately cause itself to be reset. For example, if the desire is to extend the amount of time that the control will work after a power fail, the microcomputer U2 takes the least amount of power when it is halted but a characteristic of the particular microcomputer U2 chosen was that it can halt itself but it cannot come out of halt. The only way to restore operation after a halt is to reset it. Therefore it is possible that the microcomputer U2 can detect a power failure, halt itself and wait for the PRUN circuit to notice that there are no PRUN cycles and then reset the microcomputer U2. The reset will then take the microcomputer U2 out of halt mode and the microcomputer U2 can take care of housekeeping functions, updating times, things of this sort and then put itself into halt again. By this means the microcomputer U2 can spend most of its time halted when there is a lack of power and it will operate much longer on the stored energy in the filter capacitors after a power fail.

While the blocks or boxes 25, 26 and 27 illustrated in FIGS. 2A and 2B have the components thereof illustrated as discrete parts in FIGS. 3 and 4, it is to be understood that such boxes 25, 26 and 27 could be part of a single application specific integrated circuit chip known as an ASIC in the integrated circuit art. Therefore, since only one form of discrete components is illustrated in FIGS. 3 and 4 and comprise one working embodiment of this invention, it is to be understood that other discrete forms thereof with different values can be provided as well as the functions thereof in any appropriate manner in an ASIC with such structural changes still producing the same results or functions that comprise the features of this invention so that it is to be further understood that the claims of this invention are not limited to the specific discrete components and the values thereof previously illustrated and described.

Nevertheless, it can be seen that the control system 20 of this invention provides a voltage regulator means that provides an early warning signal before the output of the voltage regulator means goes out of regulation due to power failure or low input voltage so external logic can shut down in a controlled manner.

Also, such voltage regulator means is provided with an overtemperature shutdown in that the voltage regulator means is provided with an early warning signal before the shutdown temperature thereof is reached so that external logic can shut down in a controlled manner.

The control system 20 of this invention also provides a power-on reset circuit means that requires no RC networks or timers while almost guaranteeing that a microcomputer's reset requirements will be met (fast rise and fall times with minimum pulse high and low times).

Such a power-on reset circuit means of this invention also will operate without change for external logic of either plurality (active high or active low reset inputs).

Such a power-on reset circuit means of this invention also cannot be disabled or caused to work incorrectly due to failures, such as any open or shorted components, pins open or shorted to each other, etc.

The control system 20 of this invention also provides a watchdog circuit means that resets external logic if the logic ceases to function, the watchdog circuit means not being defeated or disabled due to failure, such as any open or shorted components, pins open or shorted to each other, etc.

Such a watchdog circuit means of this invention also disables the outputs of the microcomputer means in case the microcomputer means ceases to operate correctly and cannot be restored by reset to proper operation thereof.

Such a watchdog circuit means of this invention also detects low line voltage and disables the outputs thereof before improper operation can result.

The circuit means 20 of this invention also provides a regulated relay supply voltage that reduces costs by reducing transformer power requirements and reduces heating in relay and transformer coils allowing the same to operate in higher ambient temperatures.

The control system 20 of this invention is adapted to drive an RTD temperature sensing means with a constant current while using the sensing means to sense temperature in the oven of the cooking apparatus, all operating voltages thereof being between 0 and +5 VDC for compatibility with normal integrated circuit operating voltages.

The control system 20 of this invention also provides a means for extending the time that an appliance control can maintain data without AC power. For example, upon failure, the microcomputer means of this invention is halted to minimize power usage. A watchdog circuit means thereof periodically resets the microcomputer means which takes the microcomputer means out of the halt mode and if the microcomputer means sees no AC power, the microcomputer means then goes back into halt.

In addition, the control means 20 of this invention provides a means for combining an AC power present signal, an AC zero crossing phase reference, a power fail warning, and an overtemperature warning all into a single pin (ACREF 10) to minimize the connections necessary to a microcomputer means.

As previously stated, an advantage of the watchdog circuit of this invention is that a component failure anywhere in the circuit, any component either shorted or opened, is detectable by the microcomputer U2 and will result in turning off the WD pin. If a fault occurs that results in the WD output pin 15 being forced to a high state when it should be a low state, such as a collector to emitter short of the watchdog output transistor Q'2, the WDOG input pin 3 will be at a low logic level. Noting FIG. 2A, the resistor R47 connects the emitter of transistor Q'2 to its base and also will supply current into the WD pin 15. Noting FIG. 4, even if the WD transistor Q6 is turned off, a high voltage level at the emitter of transistor Q'2 will source current into the WD pin 15, through resistor R28 into the base of transistor Q3 which turns it on and pulls the WDOG pin 3 to a low state through the resistors R22 and R23 as previously explained. This provides the microcomputer U2 with a fault indication that the watchdog transistor and/or highside driver transistor Q'2 is in a potentially unsafe state and may not be capable of turning off. When this occurs, the microcomputer U2 has a redundant means of turning off the Bake heating element 21 and the Broil heating element 22, via the lowside relay drivers U'1A and U'1B as previously explained. Thus the microcomputer U2 can monitor the status of the highside driver transistor Q'2 and disable the lowside drivers U'1A and U'1B if a fault is detected.

The microcomputer U2 implementation of the logic to the lowside relay drives U'1A and U'1B is also redundant. Noting FIG. 2B, the logic to the lowside Bake relay driver U'1A is interfaced through the resistor R'44 to an internal PMOS transistor to the VCC power supply. It is also directly interfaced to an internal Bake NMOS transistor. The logic of the microcomputer U2 is such that the PMOS transistor must be in an on state connecting the high side of the resistor R'44 to VCC and the Bake NMOS transistor must be in an off state, disconnecting the input of relay driver U'1A pin 1 from a ground potential, to allow bias current to pass from VCC through PMOS transistor and through the resistor R'44 into the input of the lowside Bake relay driver U'1A to turn it on. This is a logic and function that uses independent and complementary PMOS and Bake NMOS transistors which must be biased in opposite output logic states to turn on the lowside relay driver U'1A output pin 16 to a ground potential. Whereby, when the lowside relay driver U'1A pin 16 provides a ground potential to the relay coil 36 of relay means K2, it will be energized if the highside relay driver transistor Q'2 is also in an on state and supplying the VDD potential to the opposite side of the relay coil 36 of the relay means K2 as previously explained. In a similar manner the lowside Broil relay driver U'1B has a redundant logic and function via the PMOS transistor, the resistor R'44 and Broil NMOS transistor into the input of the relay driver U'1 pin 2.

It should be noted that while the redundant logic and function to activation of the lowside relay drivers U'1A and U'1B is desirable, it is not necessary in the scope of this invention. For example, a single microcomputer logic output capable of both high and low logic states interfaced to the input of lowside relay driver U'1A pin 1 will also activate the coil 36 of relay means K2 in a manner previously explained. It is also believed that othermeans of providing a logic and function are also possible, such as interfacing the high side of the resistor R'44 directly to VCC and providing a second bake NMOS transistor with independent on/off logic, in parallel with the first described Bake NMOS transistor, and requiring both transistors to be in an off state to enable a high logic level into lowside relay driver U'1A input pin 1, in a manner well known to those skilled in the art.

A feature and advantage of implementing the redundant logic and function previously described, is a single microcomputer output such as the PMOS transistor can be used to enable and/or disable several lowside relay drivers such as the drivers U'1A and U'1B previously explained. For example, some microcomputers may not provide a low logic level when the microcomputer RESET logic input is in the active state, and conversely provides a high output logic state, which activates the lowside relay drivers and could energize the heating elements if other logic conditions are also present. In this case, the single PMOS transistor and/or other highside microcomputer controlled logic switch such as an external PNP transistor, can be implemented such that it is off when the microcomputer RESET logic is in the active state, and disables the low side relay drivers in an off state.

Therefore, it can be seen that this invention not only provides a new temperature regulating control system for an oven of a cooking apparatus or the like, but also this invention provides a new method of operating such a control system and a new method of making such a control system.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. A temperature cooking apparatus regulating control system for an oven of a cooking apparatus, comprising:

a circuit interconnecting a power source to a load of said apparatus in a regulated manner so as to tend to provide a selected temperature output of said load for said oven, said circuit comprising at least:

a microcomputer;

an external component;

a voltage regulator connected to said power source and said microcomputer so that said microcomputer can operate said external component;

temperature sensing means to sense the ambient temperature of a portion of said circuit that is remote from said oven and provide a warning signal to said microcomputer that a first high ambient temperature has been sensed so that said microcomputer can shut down said external component of said system in a controlled manner before a second high ambient temperature is sensed by said temperature sensing means; and wherein said voltage regulator comprises detection means to provide a warning signal to said microcomputer that said regulated voltage is going out of regulation so that said microcomputer can shut down said external component of said system in a controlled manner before said voltage regulator turns off.

2. A temperature cooking apparatus regulating control system for an oven of a cooking apparatus, comprising:

a circuit interconnecting a power source to a load of said apparatus in a regulated manner so as to tend to provide a selected temperature output of said load for said oven, said circuit comprising at least:

a microcomputer, an external component, a voltage regulator connected to said power source and said microcomputer so that said microcomputer can operate said external component, and temperature sensing means to sense the ambient temperature of a portion of said circuit that is remote from said oven and provide a warning signal to said microcomputer that a first high ambient temperature has been sensed so that said microcomputer can initiate corrective action in a controlled manner before a second high ambient temperature is sensed by said temperature sensing means; and wherein said circuit further comprises a power-on reset means that operates said microcomputer by supplying an active-high and an active-low signal from a single terminal to a reset input of said microcomputer.

3. A temperature cooking apparatus regulating control system for an oven of a cooking apparatus, comprising:

a circuit interconnecting a power source to a load of said apparatus in a regulated manner so as to tend to provide a selected temperature output of said load for said oven, said circuit comprising at least:

a microcomputer, an external heat generating component, a voltage regulator connected to said power source and said microcomputer so that said microcomputer can operate said external component, and temperature sensing means to sense the ambient temperature of a portion of said circuit that is remote from said oven and provide a warning signal to said microcomputer that a first high ambient temperature has been sensed so that said microcomputer can shut down said external heat generating component of said system in a controlled manner before a second high ambient temperature is sensed by said temperature sensing means; and wherein said microcomputer comprises a reset input and a pulsing output means that continuously pulses when said microcomputer has been reset and is then operating properly, and wherein said circuit further comprising a power-on reset means that toggles between a high state and a low state at said reset input of said microcomputer until said power-on reset means receives said continuous pulses from said pulsing output means of said microcomputer.

4. A temperature regulating control system for an oven of a cooking apparatus, comprising:

a circuit interconnecting a power source to a load of said apparatus in a regulated manner so as to tend to provide a selected temperature output of said load for said oven, said circuit comprising at least:

a microcomputer, an external component, and a voltage regulator connected to said power source and said microcomputer so that said microcomputer can operate said external component, wherein said voltage regulator comprises detection means to provide a warning signal to said microcomputer that said regulated voltage is going out of regulation so that said microcomputer can shut down said external component of said system in a controlled manner before said voltage regulator turns off.

5. A temperature regulating control system for an oven of a cooking apparatus, comprising:

a circuit interconnecting a power source to a load of said apparatus in a regulated manner so as to tend to provide a selected temperature output of said load for said oven, said circuit comprising at least:

microcomputer, an external component, a voltage regulator connected to said power source and said microcomputer so that said microcomputer can operate said external component, and a power-on reset that operates said microcomputer by supplying high and low state signals from a single terminal to a reset input of said microcomputer.

6. A temperature regulating control system for an oven of a cooking apparatus, comprising:

a circuit interconnecting a power source to a load of said apparatus in a regulated manner so as to tend to provide a selected temperature output of said load for said oven, said circuit comprising at least:

a microcomputer, an external component, and a voltage regulator connected to said power source and said microcomputer so that said microcomputer can operate said external component, wherein said microcomputer comprises a reset input and a pulsing output means that continuously pulses when said microcomputer has been reset and is then operating properly, and wherein said circuit further comprising a power-on reset means that toggles between a high state and a low state at said reset input of said microcomputer means until said power-on reset means receives said continuous pulses from said pulsing output means of said microcomputer.

7. A control system for an oven comprising:

a power source;

a load; and a circuit connecting said power source to said load in a regulated manner to provide a selected temperature output of said load for said oven comprising at least:

a microcomputer;

an external component connected to said microcomputer;

a voltage regulator connected to said power source and said microcomputer so that said microcomputer can operate said external component; and a temperature sensor to sense the ambient temperature of a portion of said circuit that is remote from said oven and provide a warning signal to said microcomputer that a first high ambient temperature has been sensed so that said microcomputer can shut down said external components of said system in a controlled manner before a second high ambient temperature is sensed by said temperature sensor.

8. A control system for an oven, according to claim 7, wherein the voltage regulator comprises a detector for providing a warning signal to said microcomputer when said regulated voltage is going out of regulation so that said microcomputer can shut down said external component of said system in a controlled manner before said voltage regulator turns off.

9. A control system for an oven, according to claim 7, wherein said circuit further comprises a power-on reset that operates said microcomputer by supplying an active-high and an active-low signal from a single terminal to a reset input of said microcomputer.

10. A control system for an oven, according to claim 7, wherein said microcomputer comprises a reset input and a pulsing output that continuously pulses when said microcomputer has been reset and is then operating properly.

11. A control system for an oven, according to claim 10, wherein said circuit further comprises a power-on reset that toggles between a high state and a low state at said reset input of said microcomputer until said power-on reset receives said continuous pulses from said pulsing output of said microcomputer.

12. A control system for an oven comprising:

a power source;

a load; and a circuit connecting said power source to said load in a regulated manner to provide a selected temperature output of said load for said oven comprising at least:

a microcomputer;

an external component connected to said microcomputer; and a voltage regulator connected to said power source and said microcomputer so that said microcomputer can operate said external component, wherein said voltage regulator comprises a detector to provide a warning signal to said microcomputer that said regulated voltage is going out of regulation so that said microcomputer can shut down said external component of said system in a controlled manner before said voltage regulator turns off.

13. A control system for an oven comprising:

a power source;

a load; and a circuit connecting said power source to said load in a regulated manner to provide a selected temperature output of said load for said oven comprising at least:

a microcomputer;

an external component connected to said microcomputer;

a voltage regulator connected to said power source and said microcomputer so that said microcomputer can operate said external component; and a power-on reset that operates said microcomputer by supplying an active-high and an active-low signal from a single terminal to a reset input of said microcomputer.

14. A control system for an oven comprising:

a power source;

a load; and a circuit connecting said power source to said load in a regulated manner to provide a selected temperature output of said load for said oven comprising at least:

a microcomputer having a reset input and a pulsing output that continuously pulses when said microcomputer has been reset and is then operating properly;

an external component connected to said microcomputer;

a voltage regulator connected to said power source and said microcomputer so that said microcomputer can operate said external component; and a power-on reset that toggles between a high state and a low state at said reset input of said microcomputer until said power-on reset receives continuous pulses from said pulsing output of said microcomputer.

\* \* \* \* \*